US009261079B2

(12) United States Patent
Knüppel et al.

(10) Patent No.: US 9,261,079 B2
(45) Date of Patent: Feb. 16, 2016

(54) ARRANGEMENT FOR GENERATING A CONTROL SIGNAL FOR CONTROLLING A POWER OUTPUT OF A POWER GENERATION SYSTEM

(75) Inventors: Thyge Knüppel, Copenhagen N (DE); Sathees Kumar, Herning (DE); Patrik Thuring, Malmoe (SE)

(73) Assignee: SIEMENS AKTIENGESELLSCHAFT, München (DE)

( * ) Notice: Subject to any disclaimer, the term of this patent is extended or adjusted under 35 U.S.C. 154(b) by 912 days.

(21) Appl. No.: 13/489,578

(22) Filed: Jun. 6, 2012

(65) Prior Publication Data
US 2012/0313593 A1    Dec. 13, 2012

(30) Foreign Application Priority Data
Jun. 8, 2011    (EP) .................................... 11169135

(51) Int. Cl.
*H02J 3/00* (2006.01)
*F03D 7/02* (2006.01)
*H02J 3/38* (2006.01)

(52) U.S. Cl.
CPC ......... *F03D 7/0284* (2013.01); *F05B 2270/337* (2013.01); *F05B 2270/70* (2013.01); *H02J 3/386* (2013.01); *Y02E 10/723* (2013.01); *Y02E 10/725* (2013.01); *Y02E 10/763* (2013.01)

(58) Field of Classification Search
USPC ........................................................ 307/57
See application file for complete search history.

(56) References Cited

U.S. PATENT DOCUMENTS

| 4,193,005 | A | 3/1980 | Kos |
| 7,345,373 | B2 | 3/2008 | Delmerico |
| 8,219,256 | B2 * | 7/2012 | Nelson et al. ................. 700/287 |
| 2007/0085343 | A1 | 4/2007 | Fortmann |

FOREIGN PATENT DOCUMENTS

| CN | 101483344 A | 7/2009 |
| DE | 3028416 A1 | 2/1981 |
| DE | 10341504 A1 | 6/2005 |
| DE | 10357292 A1 | 8/2005 |
| DE | 69824965 T2 | 8/2005 |
| DE | 102005029000 A1 | 12/2006 |
| DE | 102009014012 A1 | 9/2010 |
| EP | 1561946 A2 | 8/2005 |
| EP | 2075463 A2 | 7/2009 |
| EP | 2075890 A1 | 7/2009 |
| EP | 2572426 A2 | 3/2013 |
| WO | WO 2010108910 A2 | 9/2010 |
| WO | WO 2011008637 A2 | 1/2011 |

* cited by examiner

*Primary Examiner* — Rexford Barnie
*Assistant Examiner* — Dru Parries

(57) ABSTRACT

An arrangement for generating a control signal for controlling a power output of a power generation system, such as a wind turbine, is provided. The power output is supplied to a utility grid. The arrangement includes a first input terminal for receiving a first input signal indicative of an actual grid frequency of the utility grid, a control circuit for generating the control signal, and an output terminal to which the control signal is supplied. The control circuit includes a bang-bang controller for generating a first power signal being indicative of a predefined amount of power to be added to the power output of the power generation system. The bang-bang controller is adapted to be activated when the first input signal falls below a first predefined threshold. The control signal depends on the first power signal.

15 Claims, 6 Drawing Sheets

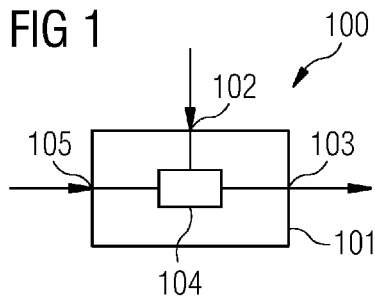
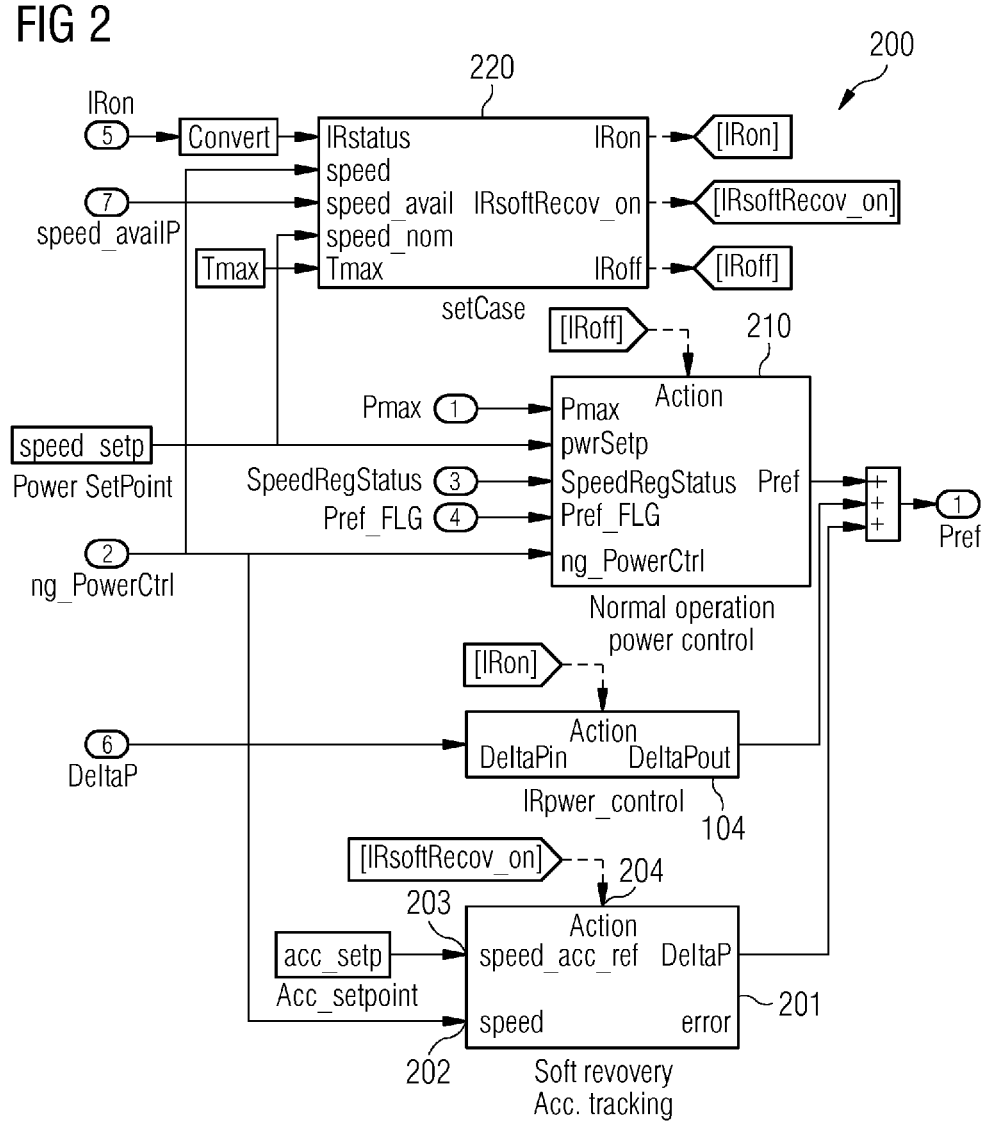

ARRANGEMENT FOR GENERATING A CONTROL SIGNAL FOR CONTROLLING A POWER OUTPUT OF A POWER GENERATION SYSTEM

CROSS REFERENCE TO RELATED APPLICATIONS

This application claims priority of European Patent Office application No. 11169135.8 EP filed Jun. 8, 2011. All of the applications are incorporated by reference herein in their entirety.

FIELD OF INVENTION

The present invention relates to an arrangement for generating a control signal for controlling a power output of a power generation system and to a power generation system including the arrangement. In particular, the present invention relates to an arrangement for generating a control signal for controlling a power output of a power generation system and to a power generation system, which is adapted to stabilize oscillations of a frequency of a utility grid to which the power generation system is supposed to supply electric energy.

BACKGROUND OF INVENTION

One or more power generation systems, such as wind turbines, may be connected to a utility grid to supply electric energy to the utility grid. On the other hand, one or more consumers or loads are connected to the utility grid to extract electric energy from the utility grid. The utility grid may deliver the electric energy in form of a AC power stream (or signal or electromagnetic wave) which have a predetermined nominal grid frequency, such as 50 Hz or 60 Hz. Thereby, the grid frequency may highly depend on the balance of generated and consumed power. This balance of generated and consumed power is necessary to keep the frequency stable, but due to outage, generation loss and sudden increase in power a variation in frequency is often observed.

U.S. Pat. No. 7,345,373 B2 discloses a system and method for utility and wind turbine control, wherein a flow of power through the converter is modulated in response to frequency disturbances or power swings of the utility system relative to an internal reference frame which is implemented as an integrator that emulates a virtual inertia with a particular magnitude defined by the constant M. Thereby, the internal reference frame has an output that is variable and is the frequency of the internal reference frame. A relative frequency is obtained as a difference of a measured frequency (measured utility system frequency) and the frequency of the internal reference frame. In particular, the frequency of the internal reference frame may differ from the utility system during frequency disturbances.

SUMMARY OF INVENTION

There may be a need for an arrangement for generating a control signal for controlling a power output of a power generation system and for a power generation system which provides improved control in case of frequency oscillations of the utility grid.

This need may be met by the subject matter according to the independent claims. Further embodiments are described by the dependent claims.

According to an embodiment an arrangement for generating a control signal for controlling a power output of a power generation system, in particular a wind turbine, is provided. The power output is supplied to a utility grid. The arrangement comprises a first input terminal for receiving a first input signal indicative of an actual grid frequency of the utility grid, a control circuit for generating the control signal, and an output terminal to which the control signal is supplied. The control circuit comprises a bang-bang controller for generating a first power signal being indicative of a predefined amount of power to be added to the power output of the power generation system. The bang-bang controller is adapted to be activated, when the first input signal falls below a first predefined threshold. Furthermore, the control signal depends on the first power signal.

The term "input/output terminal" may denote an electrical input/output terminal or an input/output node. The term "input signal" may denote an electrical signal, such as an analogue signal or a digital signal. The term "actual grid frequency" may denote a momentary frequency of the utility grid, in particular comprising one or more values, in particular at different time points, of the frequency, wherein the one or more values may indicative of a time course of the actual frequency of the utility grid. The term "utility grid" may denote a grid to which the power generation system supplies energy and from which one or more consumers extract electrical energy.

The control circuit may comprise in particular one or more integrated circuits, and/or a computer, a computer program being executed on the computer for generating the control signal, which may be in particular an electrical control signal, such as an analogue signal or a digital signal. The input signal may be continuously measured or measured at a number of sample points being spaced in time relative from each other.

The control signal may also be denoted as inertia response signal in the context of the present application. In particular, the control signal may be supplied to a wind turbine controller which in turn generates based on the control signal a power reference signal to be supplied to a converter of the wind turbine for controlling a power output of the converter (and thus of the wind turbine) depending on the power reference signal.

In particular, the control signal may be generated to cause an increase of active power output of the power generation system, when the actual grid frequency falls below a certain limit.

In particular, the wind turbine may be equipped with a full-scale converter, effectively decoupling the rotor side from the grid. In particular, the wind turbine may comprise a tower, a nacelle mounted on top of the tower, and a rotor rotatably supported within the shaft, wherein at the rotor one or more rotor blades are mounted. The rotor shaft may mechanically be coupled to a generator for generating electric energy when the rotor shaft rotates due to wind impacting on the rotor blades.

In particular, the generator of the wind turbine may generate variable frequency AC power signals (or a AC power stream) which may be supplied to the full-scale converter. The full-scale converter may first convert the variable frequency power signal to a DC power signal and may then convert the DC power signal to a fixed frequency power signal having the frequency of the utility grid under normal conditions, i.e. the nominal grid frequency. In particular, the converter may be capable of controlling a power output of the wind turbine, in particular may be adapted for decoupling the inertia of the rotor from the grid. In particular, the grid may not have a direct link to the inertia of the revolving mass of the rotor.

According to an embodiment kinetic energy, such as rotational energy of the rotor is extracted during a particular grid event, such in case when the actual grid frequency is below the nominal predetermined grid frequency. In particular, an additional active power may be delivered to the utility grid during grid drop events to stabilize the utility grid frequency. In particular, active power of the energy stored in the rotor may be injected into the utility grid in such a way that the frequency decay is pulled towards the nominal grid frequency. According to an embodiment the control signal is generated such that the wind turbine controller finally supplied with a signal based on the control signal controls the wind turbine or the wind turbine converter such as to prevent further declination of the grid frequency.

The arrangement may be arranged at turbine level or at the wind farm park pilot level. This means that the arrangement may be separated from the power control for normal operation.

The control of the power output as performed by the described arrangement may be discontinuous, which means that a certain statement (falling below first threshold) must be fulfilled in order to initiate the generation of the inertia response. The control may be based on a fixed frequency activation threshold and a fixed delta P regulation. Both values may be determined before in a control strategy, for example during design of the power generation system.

The output of the bang-bang controller may also be denoted as an active power response. The bang-bang controller may get activated when the frequency crosses a given frequency threshold. This frequency may be measured for example at Point of Common Connection (PCC) or externally in the grid, where the inputs are handled by an inertia response control scheme located in the park pilot. When the input frequency (input signal) violates the activation threshold for the IR control, the IR power reference generated in the park pilot (modified with a predetermined additional power level) will be feed into the WT control system in order for the converter to react on the new IR power reference.

According to an embodiment, the bang-bang controller is further adapted to be deactivated, when the first input signal exceeds a second predefined threshold.

The second predefined threshold is indicative for a frequency of the utility grid being associated with the normal operation of the utility grid.

According to an embodiment, the control circuit is connected in parallel with a power control system of the power generation system being used during normal operation of the power generation system.

Due to the parallel arrangement, the control circuit may deactivate the normal operation control system. This may mean that the control signal may bypass signals controlling the normal operation.

According to an embodiment, the first input signal is indicative of a deviation of the actual grid frequency from a fixed nominal grid frequency, wherein the arrangement in particular comprises a comparator for determining the frequency deviation of the actual grid frequency from the fixed nominal grid frequency.

According to an embodiment, the input signal is indicative of a deviation of the actual grid frequency from a fixed nominal grid frequency, wherein the arrangement may comprise a comparator such as a logic circuit for determining the frequency deviation of the actual grid frequency from the fixed nominal grid frequency. Including a comparator for determining the frequency deviation may allow generating the control signal based on the frequency deviation. This in particular may allow inclusion of further control elements into the arrangement which are sensitive to the absolute value of the input signal.

According to an embodiment, the arrangement further comprises a second input terminal for receiving a second input signal being indicative of an average acceleration of a generator of the power generation system, wherein the control circuit comprises a recovery unit for generating a second power signal, wherein the second power signal is based on the first and the second input signal, and wherein the control signal depends on the second power signal.

According to this embodiment, the bang-bang controller may be combined with a frequency recovery function, provided by the recovery unit or soft recovery unit, which ensures that activation of the inertia response (IR) function does not subsequently lead to over frequency events. If the frequency recovers above a given threshold (for example just below the optimal frequency or normal frequency of the utility grid) the soft recovery function may be activated and delta P (i.e. the additional power) is reduced according to a specified droop. The active power, delta P, for IR is drawn from the kinetic energy stored in the rotational masses of the wind turbine. The recovery unit may perform a controlled acceleration of the rotor and the generator before the wind turbine is released for normal operation. To this purpose, the recovery unit may further comprise an output for sending a signal to the rotor and/or generator for providing an acceleration signal. Such a signal may comprise information that the rotor and/or generator can accelerate according to a defined acceleration scheme.

According to an embodiment, the recovery unit is adapted to be activated, when the bang-bang controller is deactivated.

As explained above, the bang-bang controller may be deactivated, when the first input signal exceeds a second predefined threshold. This threshold may be just below the optimal frequency of the utility grid. The recovery unit may take over the control of the power output, i.e. generation of the control signal, when the bang-bang controller stops its generation of the control signal.

According to an embodiment, the recovery unit is adapted to be deactivated, when the second input signal reaches a predetermined threshold.

The control circuit bypasses the power control used in normal operation in order to extract additional active power from the rotational system, which is decelerated accordingly. When the inertia response is completed and normal operation is to be reactivated a double dip can occur in certain operating conditions due to different power and/or speed operation modes within the turbine control system. To avoid this unwanted consequence, the normal power control might not be reinstated until the generator speed matches that of the present or determined optimal operating condition. To achieve this, the power reference of the normal power controller may be overridden from its power and/or speed controlling scheme temporarily. During this short time period, the power reference is reduced slightly below actual power reference level (the power level where the bang-bang controller became deactivated) and a controlled acceleration of the generator is initiated by the recovery unit.

According to an embodiment, the recovery unit comprises a PI controller for generating the second power signal.

A way of knowing when the generator speed has recovered to a preferable level on, may be to use a PI (proportional-integral) controller. Such a PI controller may track the average acceleration of the generator and once the generator has been accelerated back on a preferable level, normal power control can be reactivated.

According to an embodiment, the recovery unit further comprises a limiting circuit connected between the PI controller and an output terminal of the recovery unit for limiting the control signal to be below a predetermined change per time (such that a change of the control signal within a particular time interval is below a change threshold) and/or to be in a predetermined range (a range of values of the control signal), wherein the predetermined range is 0.0 to 0.2, in particular 0.0 to 0.1, times a nominal power output (also referred to as a rated power output, i.e. a power output of the power generation system, in particular the wind turbine, for continuous operation or normal operation) of the power generation system. Thereby it may be avoided that the power generation system is operated under conditions the power generation system is not designed to operate in. Thereby, a lifetime of the power generation system may be increased.

According to an embodiment, the predetermined range depends on an actual power supplied by the power generation system to the utility grid and/or on a kinetic energy of the mechanical portion of the power generation system. Thereby, it may be possible to make inertial response deliveries more efficient as the inertia response signal (or control signal) during the recovery of the system may depend on how much power the turbine is delivering (pre-frequency dip) and how much kinetic energy is stored in the generator rotor.

Alternatively, the static limiting circuit may be a simple implementation how much active power the turbine is able to provide which may highly depend on the active power delivered to the grid (just before the inertial response) and the generator rotational speed.

According to an embodiment, the arrangement is adapted to communicate with a power generation plant controller (such as a wind farm controller HPPP) controlling a plurality of power generation systems, including the power generation system, regarding their power outputs (such that the power generation plant controller in a normal operation transmits control signals to the power generation systems to control their power output), wherein in particular the control signal is communicated to the power generation plant controller. Thereby, it is enabled that the power generation plant controller may take the control signal into account which may prevent the power generation plant controller to counteract.

In particular, as an example, a wind farm may be set to produce 50 MW at a point of common connection (PCC). Suddenly, a frequency drop may occur and the wind turbines may inject more power into the utility grid resulting in an increase in power at the PCC, such as an increase to 54 MW. The wind farm controller (also referred to as power generation plant controller) may detect this increased power at the PCC and may determine that the power at the PCC is 4 MW above the rated power. Further, the wind farm controller may reduce its power reference set point to the turbine. To avoid such an unwanted scenario the opportunity of communication between the wind turbine and the wind farm controller is provided according to an embodiment.

According to an embodiment, the arrangement further comprises a load determination unit (in particular comprising measurement equipment, a computer and/or a computer program running on the computer) for determining, (a) based on the control signal and/or (b) based on both a power output and a nominal power output of the power generation system, a load (in particular a mechanical load and/or an electrical load) of the power generation system (the load for example comprising a load in a gear or a bearing of the rotor shaft), wherein in particular the load determination unit comprises a counter for counting a number of times the control signal caused an increase of the power output of the power generation system (or wherein the counter is also adapted for measuring a time interval or a plurality of time intervals the control signal caused an increase of the power output of the power generation system), in particular for counting a number of times the control signal caused an increase of the power output of the power generation system above the nominal power output (wherein in particular the counter is also adapted for measuring a time interval or a plurality of time intervals the control signal caused an increase of the power output of the power generation system above the nominal power output, wherein the nominal power output may also be referred to as rated power output defining a power output during normal continuous operation of the power generation system).

In particular, the load determination unit may allow to estimate or measure an accumulated load the power production system or wind turbine system is subjected to. Further, the load determination unit may allow estimation or measuring of an expected lifetime of the power generation system, in particular the wind turbine. Further, the measurements or estimations of the load determination unit may be taken into account for generating the control signal. Thus, the control signal may be generated also to be based on a load determined by the load determination unit. Thereby, the control of the power generation system regarding its power output may be improved.

According to an embodiment, a power generation system, in particular a wind turbine system, for supplying electrical power to a utility grid is provided, wherein the power generation system comprises an arrangement for generating a control signal for controlling a power output of the power generation system according to one of the above described embodiments; and a generator and/or converter arranged to receive the control signal (or a signal generated based on the control signal, e.g. using a further wind turbine controller) and to adapt the power output in dependence of the control signal. In particular, the control signal may be supplied to an additional wind turbine controller which in turn supplies a signal, in particular a power reference signal, to the generator and/or the converter.

In particular, the control signal may be used by the converter to trigger conducting states of one or more semiconductor switches, such as IGBTs, which control the flow of power through the converter. In particular, the converter may receive a variable frequency AC power signal from the generator (which may be mechanically coupled to the rotor shaft having rotor blades fixed thereto) to a DC power signal using one or more semiconductor switches, such as isolated gate bipolar transistors (IGBTs). The DC power signal may then be converted by the converter using one or more IGBTs to a fixed frequency AC power signal having a frequency close to the fixed nominal grid frequency. Controlling the conducting states of the IGBTs comprised in the converter may allow controlling flow of power through the IGBT into the utility grid. Thereby, the frequency oscillations in the utility grid may be decreased.

According to an embodiment, the control signal is generated such that the power generation system is caused to increase its power supply to the utility grid (thus to increase the power output of the power generation system), when the actual grid frequency is below the nominal grid frequency, in particular longer than a predetermined time interval.

It should be understood that features (individually or in any combination) disclosed, described, used for or mentioned in respect to the description of an embodiment of an arrangement for generating a control signal for controlling a power output of a power generation system may also be (individually or in any combination) applied, used for, or employed for a method for generating a control signal for controlling a power output of a power generation system.

According to an embodiment a method for generating a control signal for controlling a power output of a power generation system, in particular a wind turbine, is provided, wherein the power output is supplied to a utility grid. The method comprises receiving a first input signal indicative of an actual grid frequency of the utility grid, generating the control signal by a control circuit comprising a bang-bang controller, and supplying the control signal to an output terminal. The method comprises further generating, by the bang-bang controller, a first power signal being indicative of a predefined amount of power to be added to the power output of the power generation system, wherein the bang-bang controller is activated, when the first input signal falls below a first predefined threshold, and wherein the control signal depends on the first power signal.

According to a further aspect, there is provided a computer program for generating a control signal for controlling a power output of a power generation system. The computer program, when being executed by a data processor, is adapted for controlling the above described method for generating a control signal for controlling a power output of a power generation system.

As used herein, reference to a computer program is intended to be equivalent to a reference to a program element containing instructions for controlling a computer system to coordinate the performance of the above described method.

The computer program may be implemented as computer readable instruction code in any suitable programming language, such as, for example, JAVA, C++, and may be stored on a computer-readable medium (removable disk, volatile or non-volatile memory, embedded memory/processor, etc.). The instruction code is operable to program a computer or any other programmable device to carry out the intended functions. The computer program may be available from a network, such as the World Wide Web, from which it may be downloaded.

The present technique may be realized by means of a computer program respectively software. However, the technique may also be realized by means of one or more specific electronic circuits respectively hardware. Furthermore, the technique may also be realized in a hybrid form, i.e. in a combination of software modules and hardware modules.

According to a further aspect, there is provided a computer-readable medium (for instance a CD, a DVD, a USB stick, a floppy disk or a hard disk), in which a computer program for generating a control signal for controlling a power output of a power generation system is stored, which computer program, when being executed by a processor, is adapted to carry out or control a method for generating a control signal for controlling a power output of a power generation system.

It has to be noted that embodiments of the present technique have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects are apparent from the examples of embodiment to be described hereinafter and are explained with reference to the examples of embodiment. The invention will be described in more detail hereinafter with reference to examples of embodiment but to which the invention is not limited.

BRIEF DESCRIPTION OF THE DRAWINGS

Specific embodiments are now described with reference to the accompanying drawings.

FIG. 1 illustrates an arrangement for generating a control signal for controlling a power output of a power generation system according to an embodiment;

FIG. 2 illustrates a wind turbine power control including the arrangement illustrated in FIG. 1 according to an embodiment;

DETAILED DESCRIPTION OF INVENTION

Figure 3:
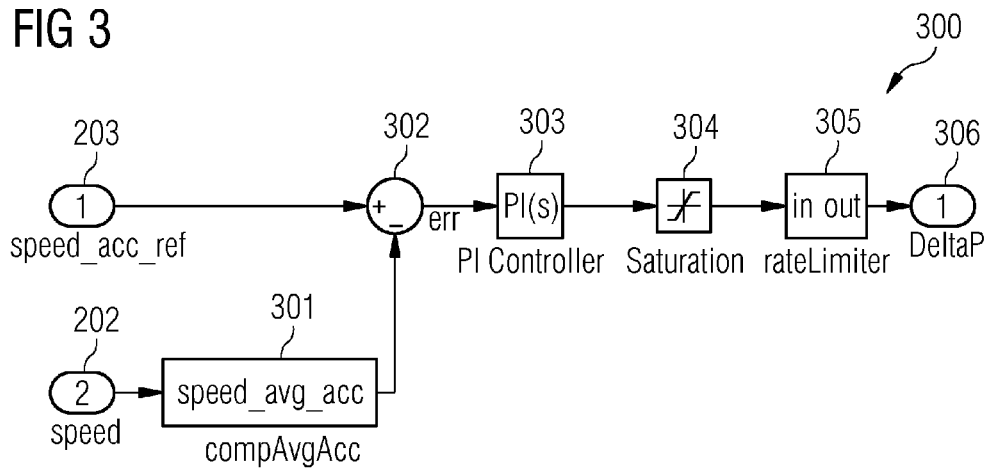
FIG. 3 illustrates a recovery unit according to an embodiment.

The illustration in the drawings is in schematic form. It is noted that in different figures, similar or identical elements are provided with the same reference signs.

In power generation systems, the grid frequency highly depends on the balance of generated and consumed power. This balance is necessary to keep the grid frequency stable, but due to outage, generation loss and sudden increase in power, a variation in frequency is seen. Common power plants increase production of active power when the frequency falls below a certain limit, and conversely reduce the power production when having over frequency event.

Common power plants are to be replaced by large scale wind farms within the coming decades which sets new requirement for the operation and control of wind power plants (WPP). Wind turbines (WT) with a full-scale converter have effectively decoupled the rotor side from the grid dynamics. This decoupling results in that the grid does not have a direct link to the inertia of the revolving masses.

According to an embodiment as illustrated in FIG. 1, an arrangement 100 for generating a control signal for controlling a power output of a power generation system is provided. The power generation system may be in particular a wind turbine. The power output the power generation system is supplied to a utility grid.

The arrangement comprises a first input terminal 105 for receiving a first input signal indicative of an actual grid frequency of the utility grid. A control circuit 101 is provided for generating the control signal. The arrangement comprises further an output terminal 103 to which the control signal is supplied.

The control circuit comprises a bang-bang controller 104 for generating a first power signal being indicative of a predefined amount of power to be added to the power output of the power generation system. The bang-bang controller is adapted to be activated, when the first input signal falls below a first predefined threshold. The control signal depends on the first power signal. The predefined amount of power may be supplied to the arrangement via input terminal 102.

This arrangement generates a virtual inertia response to the power generation system. Kinetic energy from the WT rotor is extracted during grid events. By the described arrangement, it may be possible to reduce/remove power losses generated from curtailed power references in the WTs running in some sort of frequency stabilizing mode by deliver additional active power above present optimal generation to the grid during under frequency events to stabilize the grid frequency. This is done by extracting additional power (presented by the control signal and the predefined amount of power) from the energy stored in the rotor which will be injected into the grid for the purpose of stabilizing the net frequency. During the additional energy extraction, the rotating mass of the drive train will be momentarily reduced in speed. The described control structure of Inertial Response (IR) may be implemented at turbine level but also at the wind farm park pilot level or equivalent in the grid.

Figure 4:
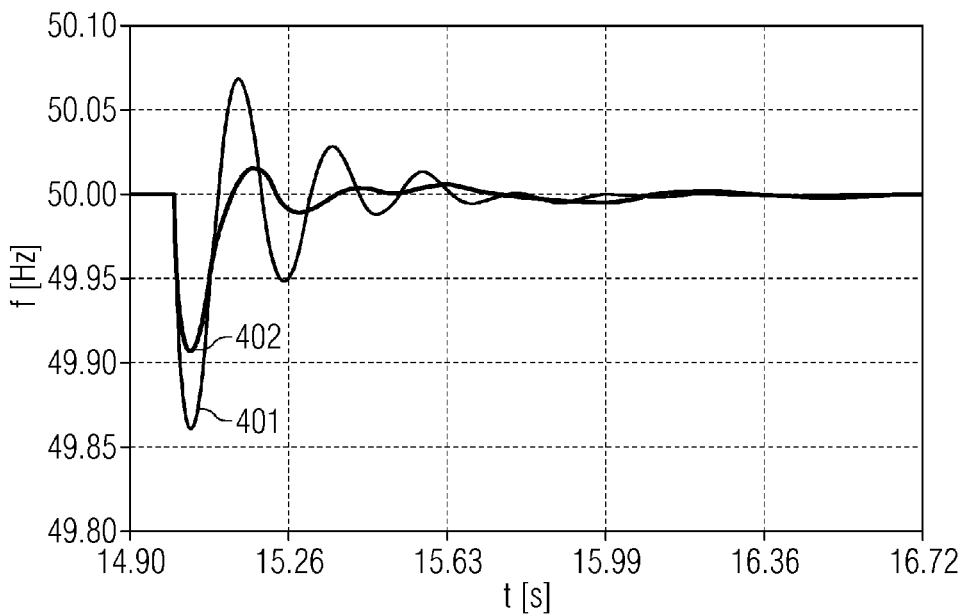
FIG. 4 illustrates a graph of an actual grid frequency according to a conventional method and according to an embodiment of a method for generating a control signal for controlling a power output of a power generation system.

A typical under frequency event is shown in FIG. 4. The purpose of the described arrangement is to inject active power extracted from energy stored in the rotor in such way that the initial frequency drop is limited.

FIG. 4 illustrates a graph showing on its abscissa the time t in seconds and on its ordinate the actual frequency f of the utility grids in Hertz. Thereby, a curve 401 depicts the time course of the actual frequency without performing controlling the power output of the power generation system and the curve 402 denotes the time course of the actual grid frequency when the power of the power generation system is controlled according to an embodiment. In particular, the nominal grid frequency amounts to 50 Hz. As can be seen from FIG. 4 a deviation of the actual grid frequency from the nominal grid frequency is lower when the power output of the power generation system is controlled according to an embodiment compared to a case where such a controlling is not performed. The inclusion of the inertial controller or arrangement shows that the impact of the controller prevents further declination of frequency compared to the frequency without virtual inertial controller.

The described arrangement is of a discontinuous kind, which means that a certain statement must be fulfilled in order to initiate IR. Also, the arrangement does not involve any control philosophy as PID control schemes or any emulating of a synchronous machine. Instead, the arrangement is based on a fixed frequency activation threshold and a fixed delta P regulation, where both are predetermined in the control strategy.

Figure 5:
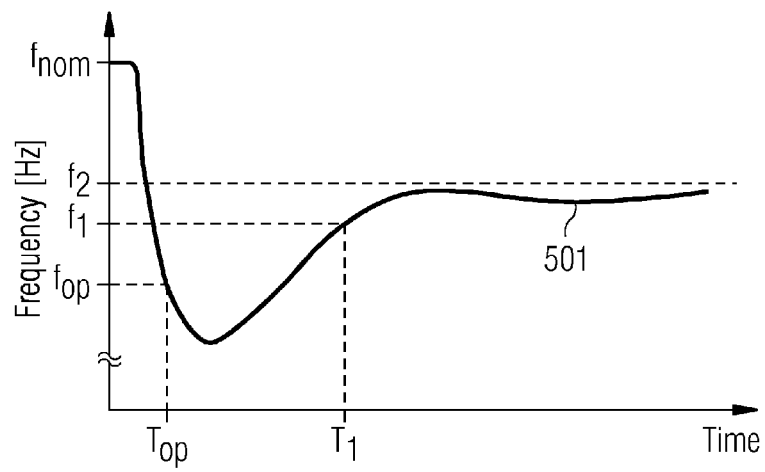
FIG. 5 illustrates a graph of a frequency response characteristic of an inertia controller in an under frequency event.
Figure 6:
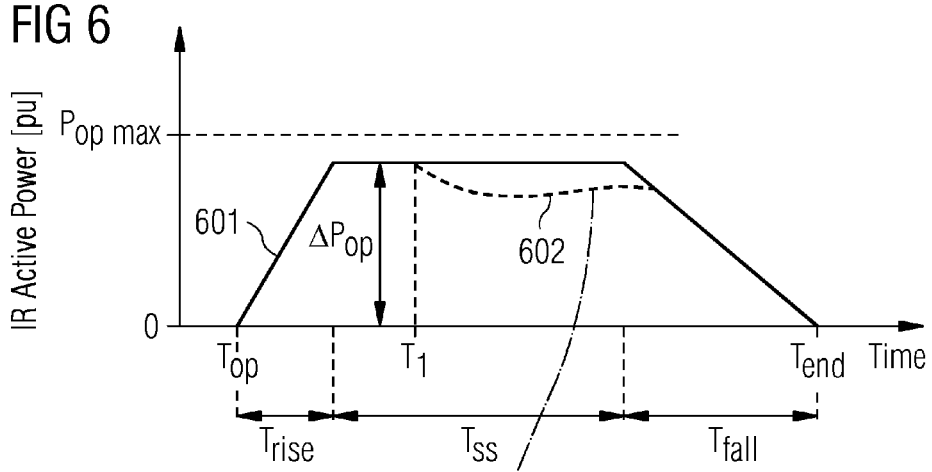
FIG. 6 illustrates a graph of an active power characteristic of an inertia controller in an under frequency event.
Figure 7:
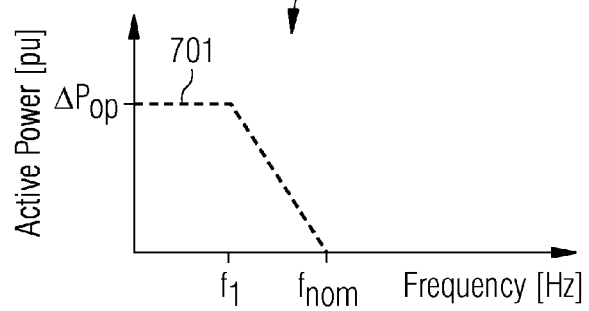
FIG. 7 illustrates a graph of a frequency recovery.

A schematic under frequency event is shown in FIGS. 5, 6 and 7. FIG. 5 shows a response characteristic of an inertial controller in an under frequency event, where the frequency does not recover above a recovery threshold (501) and a nominal IR sequence is run (FIG. 6, 601).

FIG. 6 shows also an example of the IR response 602 according to the arrangement, which is an active power response. The response is a bang-bang control that gets activated when the frequency crosses a given frequency threshold. This frequency is either measured at Point of Common Connection (PCC) or externally in the grid, where the inputs are handled by the IR control scheme located in the park pilot. The basic concept of the Bang-Bang control approach is of the following; When the input frequency violates the activation threshold for the IR control, the IR power reference generated in the park pilot (modified with a predetermined additional power level) will be feed into the WT control system in order for the converter to react on the new IR power reference.

The bang-bang control may be combined with a frequency recovery function, which ensures that activation of the IR function does not subsequently lead to over frequency events. If the frequency recovers above a given threshold the soft recovery function is activated and delta P is reduced according to a specified droop. The active power, delta P, for IR is drawn from the kinetic energy stored in the rotational masses of the WT.

The inertial response can be designed with the parameters, $f_{op}$ (frequency threshold where IR gets activated), $f_{recovery}$ (frequency threshold above which the frequency is said to be recovering), $\Delta P_{op}$ (delta P, amplitude of IR), $T_{rise}$ (rise time of IR), $T_{ss}$ (time period with full IR), $T_{fall}$ (time period in which $\Delta P_{op}$ is ramped down) and $f_{nom}$ (nominal grid frequency). The frequency event 501 in FIG. 5 represents a loss of generation event with the corresponding frequency drop. When the frequency dips below the threshold $f_{op}$ the IR is activated and within a predetermined rise time the additional active power output (the overproduction) is ramped from 0 to the desired contribution of active power, $\Delta P_{op}$. A second frequency threshold determines when the frequency is considered to have recovered, $f_{recovery}$, and hence when the active power output should start to reduce to avoid chasing. Two scenarios are presented here 1) $f_{recovery}=f_1$ and 2) $f_{recovery}=f_2$. In case of number 1, the frequency recovers above the recovery threshold and the IR follows the dashed curve 602 in FIG. 6, which is given by the frequency recovery droop characteristic 701 in FIG. 7 (normal frequency control between wind farm park pilot and turbines). The nominal IR curve represents the maximum output in case the frequency has a second dip. In case 2, the frequency does not recover above the recovery threshold and the IR finishes the nominal sequence, steady state output and down ramp, without considering the frequency recovery droop characteristic.

FIG. 2 shows the modified wind turbine power control 200, where the normal power operation control 210 is extended with IR power control 101 and recovery unit 201. The wind turbine power control comprises a setting unit for setting values of the power control. The IR block passes the delta P power reference from the IR controller through the WT controller to the converter such that additional active power is drawn from the generator. The IR block, which includes both the activation and generation of delta P, may be located centralized (externally in the grid) and which is then distributed to the controlling units in the turbines.

The recovery unit 201 does a controlled acceleration of the rotor and the generator before the WT is released for normal operation.

Figure 8:
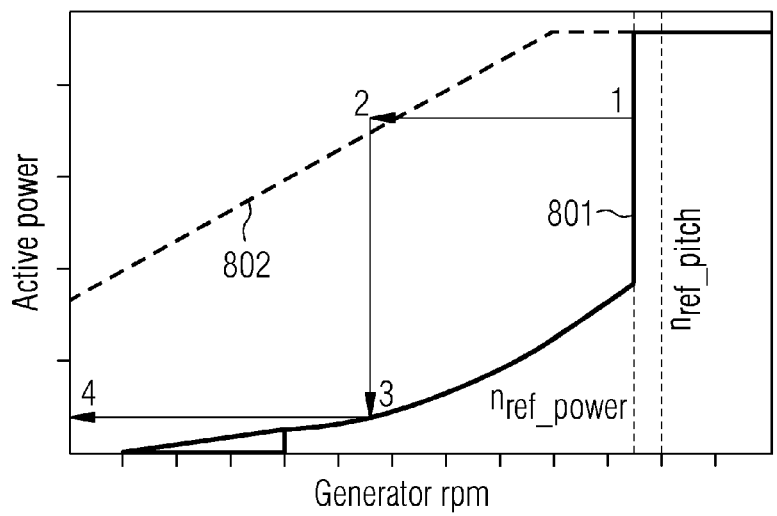
FIG. 8 illustrates a graph showing the wind turbine speed and the power curve.

The IR control scheme bypasses the power control used in normal operation in order to extract additional active power from the rotational system, which is decelerated accordingly. When IR is completed and normal operation is to be reactivated a double dip can occur in certain operating conditions due to different power/speed operation modes within the turbine control system. The process behind this is shown schematically in FIG. 8, where 1-2 is the deceleration process from IR.

One scenario can be as following; The IR operation (802) is activated at (1) which leads to a deceleration of the generator speed (801) and at (2) the normal power control is reactivated (IR operation is finished). Due to the reduced generator speed at (2), the WT controller will regulate down the optimum power output corresponding to the given generator speed curve (3). Based on the WT control power/speed curve, the power reference is set to the optimum power output that corresponds to the generator speed, hence the WT power reference is set to (4).

Figure 9:
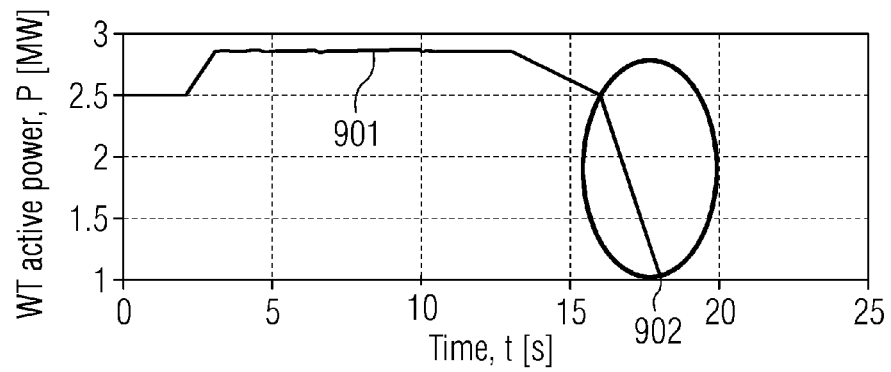
FIG. 9 illustrates a graph showing the wind turbine active power without recovery function.
Figure 10:
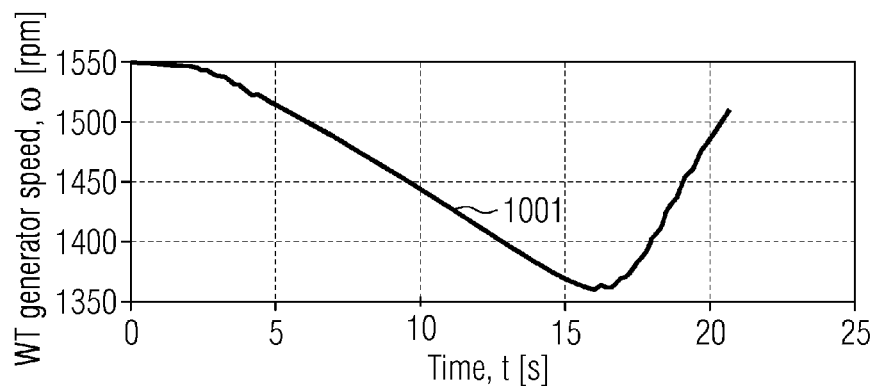
FIG. 10 illustrates a graph showing the wind turbine generator speed without recovery function.

A simulation of this is shown in FIGS. 9 and 10, wherein curve 901 shows the WT active power and curve 1001 shows the WT generator speed. The normal power control is enabled immediately after the IR sequence (902).

To avoid such an unwanted consequence, the normal power control is not reinstated until the generator speed matches that of the present optimal operating condition. To achieve this, the power reference of the normal power controller is overridden from its power/speed controlling scheme temporarily. During this short time period, the power reference is reduced slightly below actual power reference level (the power level where the IR became deactivated) and a controlled acceleration of the generator is initiated. This proceeding may be provided by the recovery unit 201, which may be receive an activation signal via terminal 204.

A way of knowing when the generator speed has recovered to a preferable level on the power/speed control curve again is shown in an exemplary recovery unit 300 shown in FIG. 3.

Figure 11:
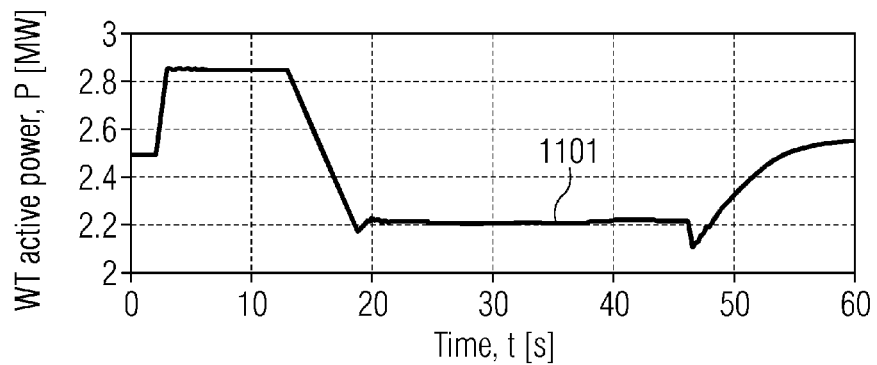
FIG. 11 illustrates a graph showing the wind turbine active power with recovery function.
Figure 12:
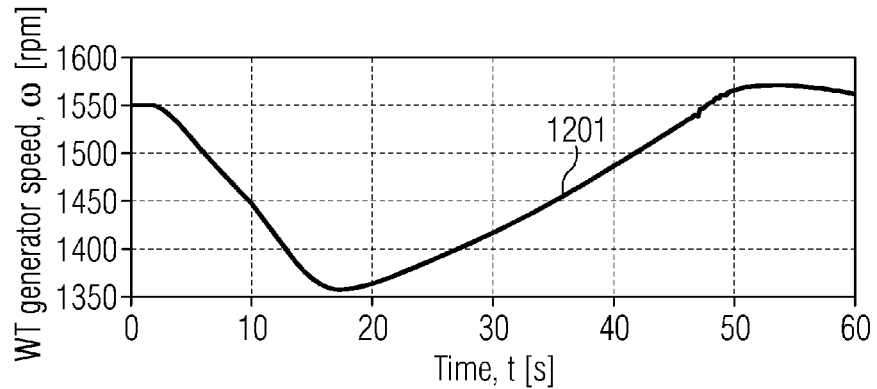
FIG. 12 illustrates a graph showing the wind turbine generator speed with recovery function.

The recovery unit receives two input signals, the actual speed 202 and a reference value of the speed 203. A PI controller 303 tracks the average acceleration of the generator and once the generator has been accelerated back on a preferable level on the power/speed curve, normal power control can be reactivated. A simulation of this is shown in FIGS. 11 and 12, wherein curve 1101 shows the WT active power and curve 1201 the WT generator speed. The acceleration of the WT generator speed is controlled until normal operation is achieved and normal operation re-enabled.

The recovery unit comprises a comparison unit 301 for providing an average acceleration signal. The comparison unit may be adapted to generate the average acceleration signals based on the speed inputted via terminal 202. This signal and the reference value are combined (302) and provided to the PI controller. The output signal of the PI controller is provided to a saturation unit 304 and then to a limiting circuit 305. The output 306 of the recovery unit corresponds to the control signal.

When a static limiter is used as limiting circuit, the signal is limited to have a value between 0 and $0.1 \, P_{nom}$. This is the simplest implementation, but it isn't the most efficient solution as the SWT in some case might be able to provide more active power to the grid. How much active power the turbine is able to provide highly depends on the active power delivered to grid (just before inertial response) and the generator speed.

Using a dynamic limiter may make IR deliveries more efficient as the P_inertia will depend on how much power the turbine is delivering (pre-frequency dip) and how much kinetic energy is stored in the generator rotor.

The limiter described is to prevent a cut-off due to low generator rpm. This method should also prevent erroneous activation of FRT operation by not reducing the reactive power capability during operation with low system voltage.

A further functionality in the wind farm controller is to count how many times a turbine has released IR to the grid in order to not reduce the lifetime of the turbine. This may be done by including a counter in the system which manages how many times a turbine has activated IR within a specific time range to consider the loads and lifetime of the turbine. Huge rotor accelerations will load the gearbox and therefore a counter system needs to be implemented to manage the number of inertial response in a specific time range. The IR may be triggered centrally from the park pilot controller and dispatched to the individual WTs. The individual WTs can then decide to reject the IR request if local conditions require this, for instance if the WT has reached the maximum number of activations.

The first priority of the WT is to protect its normal operation, and the WT may be, hence, capable of terminating an IR to protect against disconnection of the WT, for example if the IR is pushing the WT into an operating condition where the operation of the WT is threatened. One example of this can be the cut-in rotational speed of the generator.

In a further embodiment, the IR may be implemented on the individual WTs. For this implementation, the whole chain of the IR control structure may be located at the turbine level. This means that the detection, control and communication are included within the WT controller. The amount of IR to the grid might have to be hidden for the wind farm controller. This is shown in FIG. 13.

The idea of having established a communication between the turbine and wind farm control will prevent the park to counteract. An example will illustrate this: A wind farm is set to produce 50 [MW] at PCC. Suddenly a frequency drop event occur and the turbines injects more power into grid resulting in an increase in power at PCC, to for example 54 [MW]. The wind farm controller will detect this discrepancy and identifying an error of 4 [MW]. The consequence of this will be a reduction of the power reference set point from the park pilot to the turbine(s).

Figure 13:
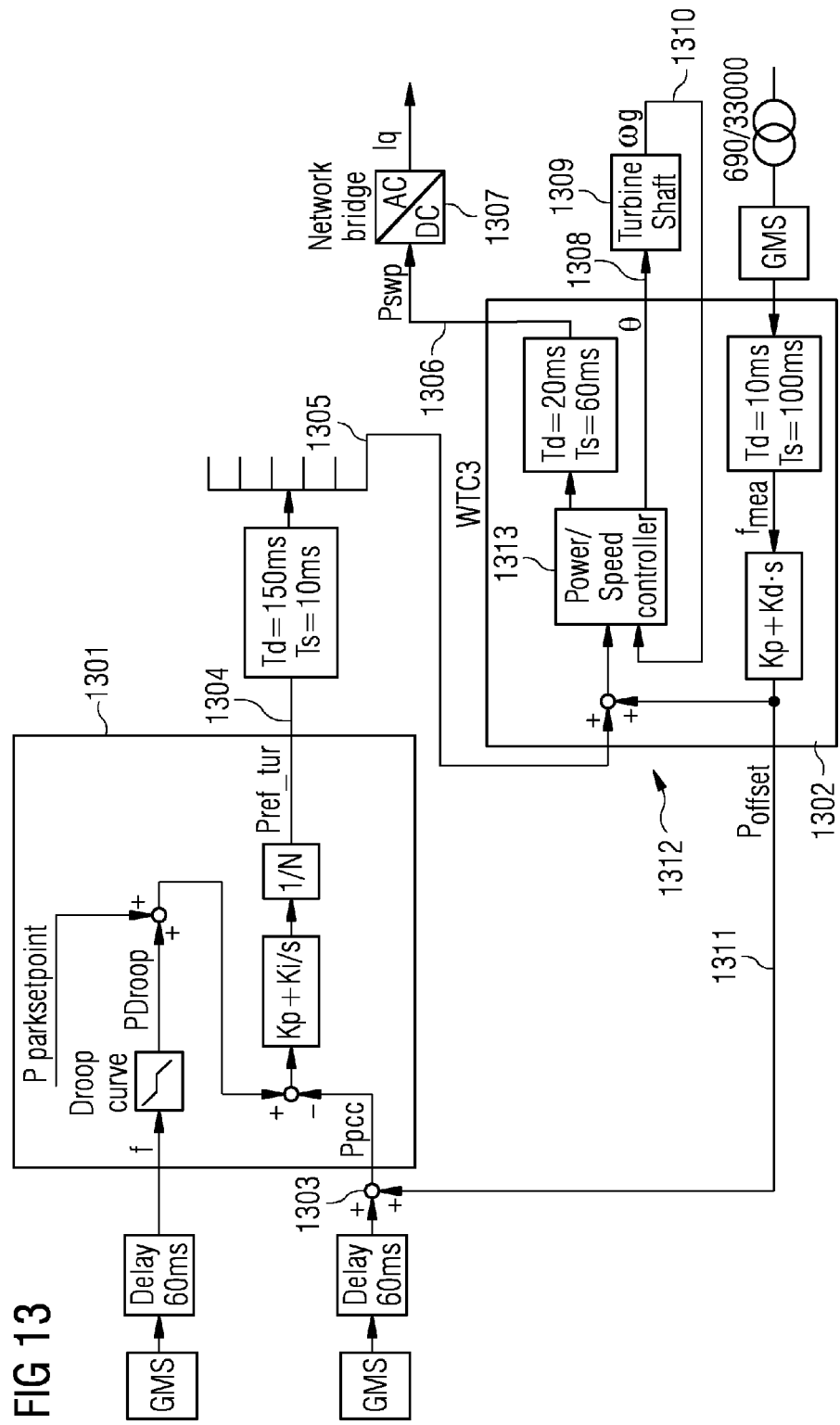
FIG. 13 schematically illustrates a portion of a power generation plant including a power generation system controlled by the arrangement illustrated in FIG. 1.

FIG. 13 schematically illustrates a portion of a power generation plant including one or more power generation systems 1312 (from which only one power generation system is illustrated in FIG. 13), wherein a high performance park pilot or power generation plant controller 1301 controls the power generation systems 1312. Each power generation system 1312, such as a wind turbine system, comprises a controller 1302 including a power controller 1313 which may be adapted as the power controller 200 illustrated in FIG. 2, wherein the power controller 1313 comprises an arrangement 100 for generating a control signal for controlling a power output of the power generation system 1312. As is indicated by control and/or communication lines 1311 and 1305 the power controller 1313 and in particular also the arrangement 100 comprised within the power controller 1313 is enabled to communicate with the power generation plant controller 1301, in order to communicate in particular the control signal P_inertia being provided at the output terminal 103 of the arrangement 100. Thereby, the power generation plant controller 1301 may take the control signal into account in order not to counteract. Thereby, stabilization of the grid frequency may be achieved more quickly or more accurately. The controller 1313 outputs a control signal 1308 to the turbine shaft 1309 which provides a feed back signal 1310 to the controller 1313. The power is provided via line 1306 to a network bridge 1307 which converts the power signal to fixed frequency.

The power generation plant controller 1301 receives an input signal from the point of common coupling 1303 and outputs a control signal at terminal 1304.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

While specific embodiments have been described in detail, those with ordinary skill in the art will appreciate that various modifications and alternative to those details could be developed in light of the overall teachings of the disclosure. Accordingly, the particular arrangements disclosed are meant to be illustrative only and not limiting as to the scope of the invention, which is to be given the full breadth of the appended claims, and any and all equivalents thereof.

The invention claimed is:

1. An arrangement for generating a control signal for controlling a power output of a power generation system, wherein the power output is supplied to a utility grid, the arrangement comprising:
a first input terminal for receiving a first input signal indicative of an actual grid frequency of the utility grid;
a control circuit for generating the control signal; and
an output terminal to which the control signal is supplied;
wherein the control circuit comprises a bang-bang controller for generating a first power signal being indicative of a predefined amount of power to be added to the power output of the power generation system,
wherein the bang-bang controller is adapted to be activated, when the first input signal falls below a first predefined threshold, and
wherein the control signal depends on the first power signal;
further comprising a load determination unit for determining a load of the power generation system, based on the control signal and/or based on both a power output and a nominal power output of the power generation system;
wherein the load determination unit comprises a counter for counting a number of times the control signal caused an increase of the power output of the power generation system.

2. The arrangement according to claim 1, wherein the bang-bang controller is further adapted to be deactivated, when the first input signal exceeds a second predefined threshold.

3. The arrangement according to claim 1, wherein the control circuit is connected in parallel with a power control system of the power generation system being used during normal operation of the power generation system.

4. The arrangement according to claim 1, wherein the first input signal is indicative of a deviation of the actual grid frequency from a fixed nominal grid frequency, wherein the arrangement in particular comprises a comparator for determining the frequency deviation of the actual grid frequency from the fixed nominal grid frequency.

5. The arrangement according to claim 1, further comprising:
a second input terminal for receiving a second input signal being indicative of an average acceleration of a generator of the power generation system,
wherein the control circuit comprises a recovery unit for generating a second power signal,
wherein the second power signal is based on the first and the second input signal, and
wherein the control signal depends on the second power signal.

6. The arrangement according to claim 5, wherein the recovery unit is adapted to be activated, when the bang-bang controller is deactivated.

7. The arrangement according to claim 5, wherein the recovery unit is adapted to be deactivated, when the second input signal reaches a predetermined threshold.

8. The arrangement according to claim 5, wherein the recovery unit comprises a PI controller for generating the second power signal.

9. The arrangement according to claim 8, wherein the recovery unit comprises a limiting circuit connected between the PI controller and an output terminal of the recovery unit for limiting the second power signal to be below a predetermined change per time and/or to be in a predetermined range, wherein the predetermined range is 0.0 to 0.2, in particular 0.0 to 0.1, times a nominal power output of the power generation system.

10. The arrangement according to claim 9, wherein the predetermined range depends on an actual power supplied by the power generation system to the utility grid and/or on a kinetic energy of a mechanical portion of the power generation system.

11. The arrangement according to claim 1, wherein the arrangement is adapted to communicate with a power generation plant controller controlling a plurality of power generation systems, including the power generation system, regarding their power outputs.

12. The arrangement according to claim 11, wherein the control signal is communicated to the power generation plant controller.

13. The arrangement according to claim 1, wherein the counter is configured to count a number of times the control signal caused an increase of the power output of the power generation system above the nominal power output.

14. A power generation system for supplying electrical power to a utility grid, the power generation system comprising:
an arrangement for generating a control signal for controlling a power output of the power generation system according to claim 1; and
a generator and/or converter arranged to receive the control signal and to adapt the power output in dependence of the control signal.

15. The power generation system according to claim 13, where the power generation system is a wind turbine system.

* * * * *